(12) United States Patent
Xu et al.

(10) Patent No.: US 11,343,802 B2
(45) Date of Patent: May 24, 2022

(54) SEMI-PERSISTENT SCHEDULING METHOD AND APPARATUS

(71) Applicant: XI'AN ZHONGXING NEW SOFTWARE CO., LTD., Shaanxi (CN)

(72) Inventors: Hui Xu, Guangdong (CN); Zhongwei Ji, Guangdong (CN); Chen Lu, Guangdong (CN); Jianfeng Ding, Guangdong (CN); Yaying Wang, Guangdong (CN); Xiaoquan Hua, Guangdong (CN)

(73) Assignee: XI'AN ZHONGXING NEW SOFTWARE CO., LTD., Xi'an Shaaxi (CN)

( * ) Notice: Subject to any disclaimer, the term of this patent is extended or adjusted under 35 U.S.C. 154(b) by 1 day.

(21) Appl. No.: 16/652,193

(22) PCT Filed: Sep. 30, 2018

(86) PCT No.: PCT/CN2018/108988
§ 371 (c)(1),
(2) Date: Mar. 30, 2020

(87) PCT Pub. No.: WO2019/063001
PCT Pub. Date: Apr. 4, 2019

(65) Prior Publication Data
US 2020/0305139 A1 Sep. 24, 2020

(30) Foreign Application Priority Data
Sep. 30, 2017 (CN) .......................... 201710923112.8

(51) Int. Cl.
*H04W 4/00* (2018.01)
*H04W 72/04* (2009.01)
(Continued)

(52) U.S. Cl.
CPC ..... *H04W 72/0406* (2013.01); *H04W 72/042* (2013.01); *H04W 72/0413* (2013.01);
(Continued)

(58) Field of Classification Search
CPC ..... H04W 92/10; H04W 92/18; H04W 88/04; H04W 72/121
See application file for complete search history.

(56) References Cited

U.S. PATENT DOCUMENTS

| | | | |
|---|---|---|---|
| 2013/0242770 A1* | 9/2013 | Chen ................. | H04W 72/1273 370/252 |
| 2017/0019887 A1 | 1/2017 | Jiang et al. | |

(Continued)

FOREIGN PATENT DOCUMENTS

| | | |
|---|---|---|
| CN | 106063352 A | 10/2016 |
| CN | 108207036 A | 6/2018 |

(Continued)

OTHER PUBLICATIONS

Office Action for the Chinese Application No. 201710923112.8, dated Feb. 20, 2021, 10 pages.
(Continued)

*Primary Examiner* — Bo Hui A Zhu
(74) *Attorney, Agent, or Firm* — KDB Firm PLLC

(57) ABSTRACT

Provided are a semi-persistent scheduling method and apparatus. The semi-persistent scheduling method includes receiving, through a first interface, semi-persistent scheduling configuration information sent by a base station, and sending the semi-persistent scheduling configuration information to a remote user equipment through a second interface to indicate that a semi-persistent scheduling mode is used in information transmission between the remote user equipment and the relay user equipment; and receiving, through the first interface, a semi-persistent scheduling signaling sent by the base station and sending the semi-persistent scheduling signaling to the remote user equipment through the second interface to indicate activation or release of a semi-persistent scheduling process between the remote user equipment and the relay user equipment. Semi-persis-
(Continued)

tent scheduling between the remote user equipment and the relay user equipment can be implemented.

16 Claims, 4 Drawing Sheets

(51) Int. Cl.
  *H04W 88/04* (2009.01)
  *H04W 92/10* (2009.01)
  *H04W 92/18* (2009.01)
(52) U.S. Cl.
  CPC ............ *H04W 88/04* (2013.01); *H04W 92/10* (2013.01); *H04W 92/18* (2013.01)

(56) References Cited

U.S. PATENT DOCUMENTS

| | | |
|---|---|---|
| 2017/0181155 A1 | 6/2017 | Chen et al. |
| 2019/0166613 A1* | 5/2019 | Zhang ............... H04W 72/1278 |
| 2019/0320361 A1* | 10/2019 | Uchiyama ............ H04W 36/03 |

FOREIGN PATENT DOCUMENTS

| | | |
|---|---|---|
| WO | 2017026970 A1 | 2/2017 |
| WO | 2017113130 A1 | 7/2017 |
| WO | 2017148231 A1 | 9/2017 |

OTHER PUBLICATIONS

Search Report for the Chinese Application No. 2017109231128, dated Feb. 20, 2021, 1 page.
Huawei et al. "Discussion on Sidelink Resource Allocation and Configuration" 3GPP TSG RAN WGI Meeting #90, R1-1712135, Aug. 25, 2017.
Nokia et al. "Discussion on Physical Layer Enhancements for Sidelink Communication and UE-to-Network Relaying" 3GPP TSG RAN WG1 Meeting #88bis, R1-1705828, Apr. 7, 2017.
International Search Report for the International Patent Application No. PCT/CN2018/108988, dated Dec. 29, 2018, 2 pages.

* cited by examiner

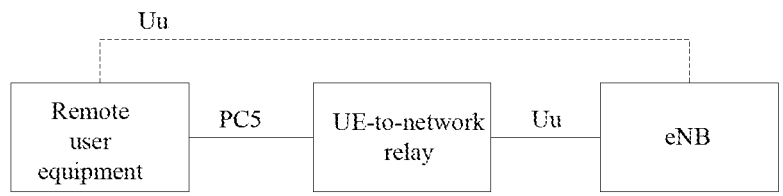

FIG.1 receive, through a first interface, semi-persistent scheduling configuration information sent by a base station, and send the semi-persistent scheduling configuration information to a remote user equipment through a second interface to indicate that a semi-persistent scheduling mode is used in information transmission between the remote user equipment and a relay user equipment — S210 receive, through the first interface, a semi-persistent scheduling signaling sent by the base station, and send the semi-persistent scheduling signaling to the remote user equipment through the second interface to indicate activation or release of a semi-persistent scheduling process between the remote user equipment and the relay user equipment — S220

FIG.2

SEMI-PERSISTENT SCHEDULING METHOD AND APPARATUS

CROSS-REFERENCE TO RELATED APPLICATIONS

This application is a U.S. National Stage Application, filed under 35 U.S.C. 371, of International Patent Application No. PCT/CN2018/108988, filed on Sep. 30, 2018, which claims a priority to a Chinese patent application No. 201710923112.8 filed on Sep. 30, 2017, disclosure of which are incorporated herein by reference in their entireties.

TECHNICAL FIELD

The present disclosure relates to the field of radio communication technologies and, in particular, to a semi-persistent scheduling method and a semi-persistent scheduling apparatus.

BACKGROUND

With the development of radio multimedia services, people's demands for high data rates and user experience are increasing, and this puts high requirements for the system capacity and coverage of a traditional cellular network. Application scenarios such as public safety, social networks, close-range data sharing and local advertising lead to an increasing demand for understanding and communicating with people or things nearby so that proximity services (ProSe) emerge. The traditional cellular network centered on a base station has obvious limitations in supporting high data rates and proximity services. Under this background, a device-to-device (D2D) technology that represents a new development direction for future communication technologies emerges. The application of the D2D technology may reduce the burden of the cellular network, reduce the battery power consumption of a user equipment, increase a data rate and improve the robustness of network infrastructure to satisfy the requirements for the high data-rate services and proximity services traffic described above. The current D2D technology is also referred to as the ProSe, or sidelink (SL) service.

The D2D technology generally includes a D2D discovery technology and a D2D communication technology. The D2D discovery technology refers to a technology for deciding/determining whether a first user equipment is adjacent to a second user equipment. Generally, D2D user equipments may send or receive discovery signals/information to discover each other. The D2D communication technology refers to a technology in which part or all of the communication data between the D2D user equipments may be directly communicated without passing through the network infrastructure.

In another aspect, with the development requirement of the Internet of everything, the 3rd generation partnership project (3GPP) has standardized machine type communication (MTC), enhanced machine type communication (eMTC) works of versions R12 and R13 has been basically completed, and the standardization of narrow band-Internet of things (NB-IoT) is currently in progress. The R13 eMTC adds support for coverage enhancement and bandwidth limitation on the basis of supporting low costs. In general, an eMTC user equipment (UE) has a radio frequency transceiving capability limited at 1.4 MHz, while an NB-IoT equipment has a radio frequency transceiving bandwidth limited to 180 kHz. The purpose of the coverage enhancement is generally achieved through multiple repetitions of data transmission between the eNB equipment and the eMTC/NB-IoT user equipment. In view of the feature of low costs of the eMTC/NB-IoT equipment, it is generally desirable to extend the lifetime of the eMTC/NB-IoT equipment as much as possible, but the coverage enhancement results in multiple retransmissions of data packets, thereby quickly consuming the power of a UE. In addition to the eMTC equipment and the NB-IoT equipment, a wearable UE also has similar application requirements, such as low costs, bandwidth limitation, low power consumption and the like.

The new project subject of the 3GPP includes enhanced D2D that is mainly for wearable UEs and Internet Of things (IOT)/MTC applications, and a remote UE (for example, the wearable UE) implements communication with a network through a UE-to-network relay. As shown in FIG. 1, the wearable equipment may communicate through a PC5 or Uu interface within the coverage of an evolved Node B (eNB), and at least uplink data is communicated by using PC5.

Semi-persistent scheduling (SPS), also referred to as semi-static scheduling, allows semi-persistently allocating radio resources and then periodically allocating the resources to the UE, that is, "one allocation and multiple uses". This is different from dynamically scheduling in which resources are allocated per sub-frame. For a service in which data packets have a substantially constant size and are sent periodically, the SPS is useful to significantly reduce control signaling load.

In the related art, semi-persistent scheduling between the remote UE and a relay UE has not been implemented.

SUMMARY

The technical problem to be solved by the present disclosure is to provide a semi-persistent scheduling method and apparatus to implement semi-persistent scheduling between a remote user equipment and a relay user equipment.

An embodiment of the present disclosure provides a semi-persistent scheduling method. The method includes the steps described below.

Semi-persistent scheduling configuration information sent by a base station is received through a first interface, and the semi-persistent scheduling configuration information is sent to a remote user equipment through a second interface to indicate that a semi-persistent scheduling mode is used in information transmission between the remote user equipment and a relay user equipment.

A semi-persistent scheduling signaling sent by the base station is received through the first interface, and the semi-persistent scheduling signaling is sent to the remote user equipment through the second interface to indicate activation or release of a semi-persistent scheduling process between the remote user equipment and the relay user equipment.

An embodiment of the present disclosure provides a semi-persistent scheduling method. The method includes the steps described below.

Semi-persistent scheduling configuration information is sent to a remote user equipment through a first interface or the semi-persistent scheduling configuration information is sent to the remote user equipment through a second interface and a third interface by using a relay user equipment to indicate that a semi-persistent scheduling mode is used in information transmission between the remote user equipment and the relay user equipment.

A semi-persistent scheduling signaling is sent to the remote user equipment through the first interface or the semi-persistent scheduling signaling is sent to the remote user equipment through the second interface and the third interface by using the relay user equipment to indicate activation or release of a semi-persistent scheduling process between the remote user equipment and the relay user equipment.

An embodiment of the present disclosure provides a semi-persistent scheduling method. The method includes the steps described below.

Semi-persistent scheduling configuration information and a semi-persistent scheduling signaling are acquired.

A semi-persistent scheduling process between a remote user equipment and a relay user equipment is activated or released according to the semi-persistent scheduling signaling, and information is sent to the relay user equipment according to the semi-persistent scheduling configuration information if the semi-persistent scheduling process is activated.

An embodiment of the present disclosure provides a semi-persistent scheduling apparatus applied to a relay user equipment. The apparatus includes a configuration information receiving and processing module and a scheduling signaling receiving and processing module.

The configuration information receiving and processing module is configured to receive, through a first interface, semi-persistent scheduling configuration information sent by a base station, and send the semi-persistent scheduling configuration information to a remote user equipment through a second interface to indicate that a semi-persistent scheduling mode is used in information transmission between the remote user equipment and the relay user equipment.

The scheduling signaling receiving and processing module is configured to receive, through the first interface, a semi-persistent scheduling signaling sent by the base station, and send the semi-persistent scheduling signaling to the remote user equipment through the second interface to indicate activation or release of a semi-persistent scheduling process between the remote user equipment and the relay user equipment.

An embodiment of the present disclosure provides a semi-persistent scheduling apparatus applied to a base station. The apparatus includes a configuration information sending module and a scheduling signaling sending module.

The configuration information sending module is configured to send semi-persistent scheduling configuration information to a remote user equipment through a first interface or send the semi-persistent scheduling configuration information to the remote user equipment through a second interface and a third interface by using a relay user equipment to indicate that a semi-persistent scheduling mode is used in information transmission between the remote user equipment and the relay user equipment.

The scheduling signaling sending module is configured to send a semi-persistent scheduling signaling to the remote user equipment through the first interface or send the semi-persistent scheduling signaling to the remote user equipment through the second interface and the third interface by using the relay user equipment to indicate activation or release of a semi-persistent scheduling process between the remote user equipment and the relay user equipment.

An embodiment of the present disclosure further provides a semi-persistent scheduling apparatus applied to a remote user equipment. The apparatus includes a configuration information and scheduling signaling acquisition module and a scheduling processing module.

The configuration information and scheduling signaling acquisition module is configured to acquire semi-persistent scheduling configuration information and a semi-persistent scheduling signaling.

The scheduling processing module is configured to activate or release a semi-persistent scheduling process between the remote user equipment and a relay user equipment according to the semi-persistent scheduling signaling, and send information to the relay user equipment according to the semi-persistent scheduling configuration information if the semi-persistent scheduling process is activated.

Compared with the related art, the present disclosure provides a semi-persistent scheduling method and apparatus. A relay user equipment receives, through a first interface, semi-persistent scheduling configuration information sent by a base station, and sends the semi-persistent scheduling configuration information to a remote user equipment through a second interface to indicate that a semi-persistent scheduling mode is used in information transmission between the remote user equipment and the relay user equipment; the relay user equipment receives, through the first interface, semi-persistent scheduling signaling sent by the base station, and sends the semi-persistent scheduling signaling to the remote user equipment through the second interface to indicate activation or release of a semi-persistent scheduling process between the remote user equipment and the relay user equipment. The technical solution of the embodiments of the present disclosure can implement semi-persistent scheduling between the remote user equipment and the relay user equipment.

BRIEF DESCRIPTION OF DRAWINGS

FIG. 1 is an architecture diagram of a communication system adopting a UE-to-network relay in the related art;

FIG. 2 is a flowchart of a semi-persistent scheduling method (for a relay user equipment) according to embodiment one of the present disclosure;

FIG. 8-1 is an architecture diagram of a communication system adopting a relay user equipment according to example one of the present disclosure (a remote user equipment is located within or out of the coverage of a base station);

FIG. 8-2 is an architecture diagram of a communication system adopting a relay user equipment according to example one of the present disclosure (a remote user equipment is located out of the coverage of a base station); and FIG. 8-3 is a schematic diagram of an interface of a communication system adopting a relay user equipment according to example one of the present disclosure.

DETAILED DESCRIPTION

The objects, technical solution and advantages of the present disclosure will be clearer from a detailed description of embodiments of the present disclosure in conjunction with the drawings. It is to be noted that if not in collision, the embodiments and features therein in the present application may be combined with each other.

In view of the feature of periodic message transmission between a remote user equipment (wearable equipment/IoT equipment/machine type communication equipment or the like) and a relay user equipment in many cases, semi-persistent scheduling is a relatively suitable scheduling mode for the purpose of saving signaling overheads and reducing latency.

Embodiment One

Figures 1, 8:
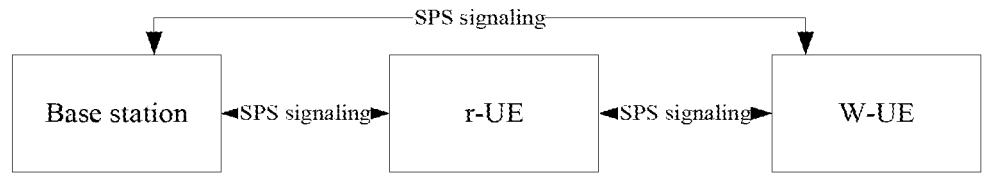
Figures 2, 8:
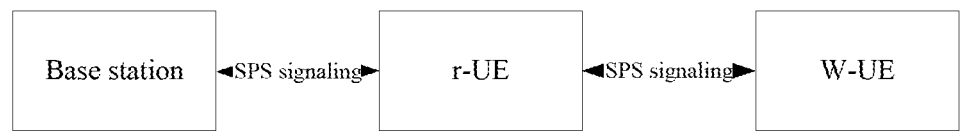
Figures 3, 8:
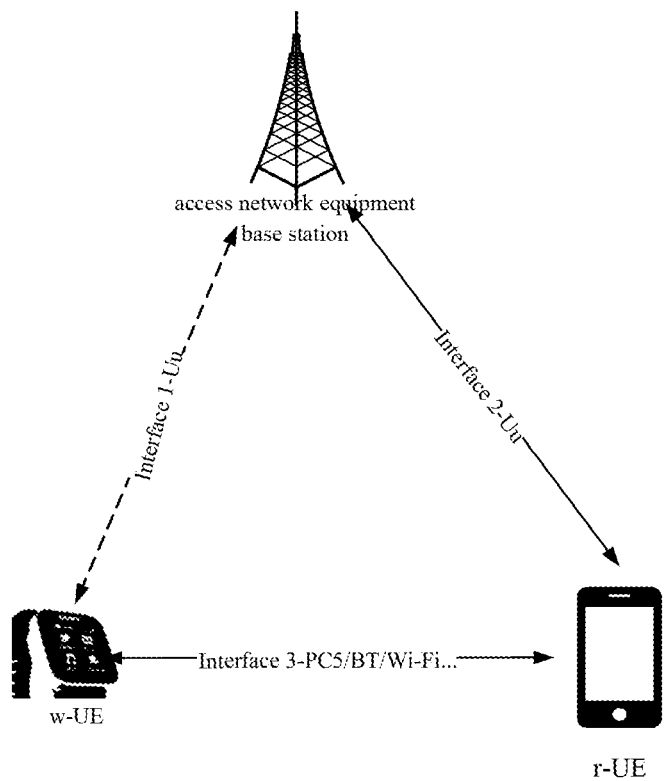

As shown in FIG. 2, an embodiment of the present disclosure provides a semi-persistent scheduling method applied to a relay user equipment. The method includes the steps described below.

In step S210, semi-persistent scheduling configuration information sent by a base station is received through a first interface, and the semi-persistent scheduling configuration information is sent to a remote user equipment through a second interface to indicate that a semi-persistent scheduling mode is used in information transmission between the remote user equipment and the relay user equipment.

In step S220, a semi-persistent scheduling signaling sent by the base station is received through the first interface, and the semi-persistent scheduling signaling is sent to the remote user equipment through the second interface to indicate activation or release of a semi-persistent scheduling process between the remote user equipment and the relay user equipment.

The method further includes the features described below.

In an embodiment, the remote user equipment includes a wearable equipment, a machine type communication equipment or an Internet of things equipment.

In an embodiment, the first interface refers to a communication interface between the relay user equipment and the base station and includes a Uu interface, and the second interface refers to an interface between the remote user equipment and the relay user equipment and includes a PC5 interface, a Bluetooth interface, a Wi-Fi interface, a wireless local area network interface, an infrared interface or a ZigBee interface. The terms "first" and "second" are used to distinguish between two different communication interfaces.

In an embodiment, the semi-persistent scheduling configuration information includes at least one of a user equipment identity, a semi-persistent scheduling period, a semi-persistent scheduling index, number of implicit releases for semi-persistent scheduling or a power control parameter.

The user equipment identity includes a radio network temporary identity of the user equipment.

In an embodiment, the semi-persistent scheduling signaling includes at least one of a semi-persistent scheduling index, an activation or release indicator, a resource block, a modulation and coding scheme or a power control indication.

The activation or release indicator is configured to indicate whether to perform activation or release. It is feasible to perform the indication by setting one or more bits to different values.

The semi-persistent scheduling index is configured to identify semi-persistent scheduling, and one or more semi-persistent scheduling processes may be activated or released simultaneously.

When the relay user equipment forwards, through the second interface, the semi-persistent scheduling signaling sent by the base station to the remote user equipment, the relay user equipment does not change the content of the signaling, but may change the form of the signaling. For example, the relay user equipment may combine multiple pieces of signaling into a single piece of signaling, divide a single piece of signaling into multiple pieces of signaling, change periodic signaling to aperiodic signaling, or change aperiodic signaling to periodic signaling.

Optionally, the signaling that carries the semi-persistent scheduling configuration information and the semi-persistent scheduling signaling includes layer 3 (network layer) signaling, layer 2 (link layer) signaling or layer 1 (physical layer) signaling.

In an embodiment, the semi-persistent scheduling configuration information is transmitted through radio resource control (RRC) signaling, and the semi-persistent scheduling signaling is transmitted through the physical layer signaling, where the physical layer signaling includes downlink control information signaling or sidelink control information signaling.

In an embodiment, cyclic redundancy check content of the semi-persistent scheduling signaling is scrambled by using the user equipment identity.

In an embodiment, the method further includes the steps described below.

Semi-persistent scheduling assistance information sent by the remote user equipment is received through the second interface, and the semi-persistent scheduling assistance information is sent to the base station through a third interface.

The semi-persistent scheduling assistance information includes an attribute parameter of a service using semi-persistent scheduling, where the attribute parameter includes at least one of a service period, a service sending time offset or a service packet size.

The semi-persistent scheduling assistance information may be sent by using the RRC signaling or MAC control element (CE) signaling.

Embodiment Two

Figure 3:
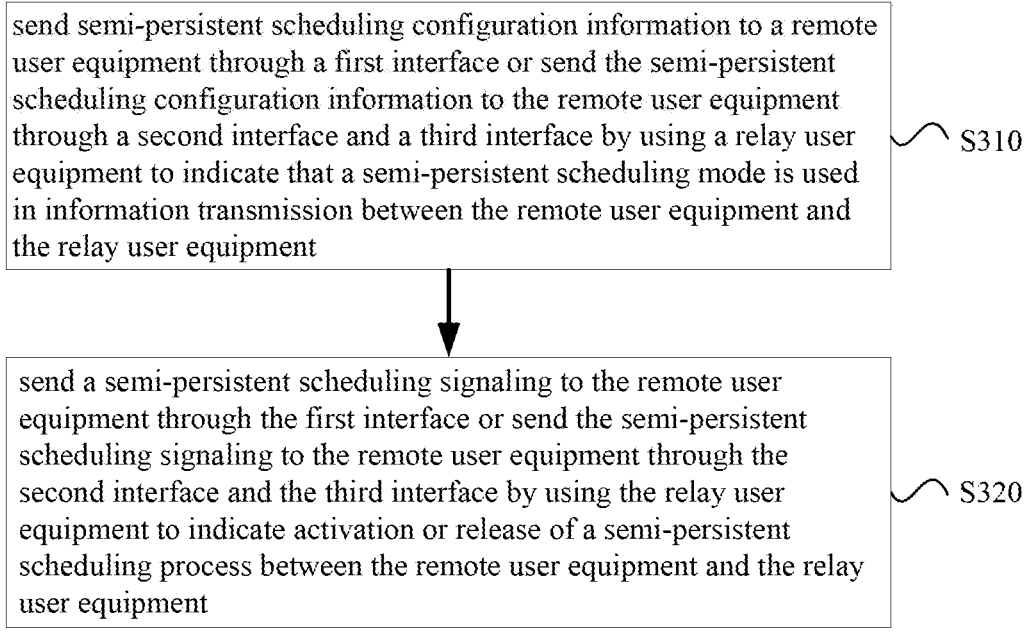
FIG. 3 is a flowchart of a semi-persistent scheduling method (for a base station) according to embodiment two of the present disclosure.

As shown in FIG. 3, an embodiment of the present disclosure provides a semi-persistent scheduling method applied to a base station. The method includes the steps described below.

In step S310, semi-persistent scheduling configuration information is sent to a remote user equipment through a first interface or the semi-persistent scheduling configuration information is sent to the remote user equipment through a second interface and a third interface by using a relay user equipment to indicate that a semi-persistent scheduling mode is used in information transmission between the remote user equipment and the relay user equipment.

In step S320, a semi-persistent scheduling signaling is sent to the remote user equipment through the first interface or the semi-persistent scheduling signaling is sent to the remote user equipment through the second interface and the third interface by using the relay user equipment to indicate activation or release of a semi-persistent scheduling process between the remote user equipment and the relay user equipment.

The method further includes the features described below.

In an embodiment, the remote user equipment includes a wearable equipment, a machine type communication equipment or an Internet of things equipment.

In an embodiment, the first interface refers to an interface between the base station and the remote user equipment and includes a Uu interface, the second interface refers to an interface between the base station and the relay user equipment and includes the Uu interface, and the third interface refers to an interface between the remote user equipment and the relay user equipment and includes a PC5 interface, a Bluetooth interface, a Wi-Fi interface, a wireless local area network interface, an infrared interface or a ZigBee interface. The terms "first", "second" and "third" are used to distinguish between three different communication interfaces.

In an embodiment, the semi-persistent scheduling configuration information includes at least one of a user equipment identity, a semi-persistent scheduling period, a semi-persistent scheduling index, number of implicit releases for semi-persistent scheduling or a power control parameter.

In an embodiment, the semi-persistent scheduling signaling includes at least one of the semi-persistent scheduling index, an activation or release indicator, a resource block, a modulation and coding scheme or a power control indication.

In an embodiment, the semi-persistent scheduling configuration information is transmitted through radio resource control (RRC) signaling, and the semi-persistent scheduling signaling is transmitted through physical layer signaling, where the physical layer signaling includes downlink control information signaling or sidelink control information signaling.

In an embodiment, cyclic redundancy check content of the semi-persistent scheduling signaling is scrambled by using the user equipment identity.

In an embodiment, the method further includes the steps described below.

Semi-persistent scheduling assistance information sent by the remote user equipment is received through the first interface, or the semi-persistent scheduling assistance information sent by the remote user equipment is received through the third interface and the second interface by using the relay user equipment.

In an embodiment, the semi-persistent scheduling assistance information is transmitted by using a radio resource control (RRC) signaling and includes an attribute parameter of a service using semi-persistent scheduling, where the attribute parameter includes at least one of a service period, a service sending time offset or a service packet size.

Embodiment Three

Figure 4:
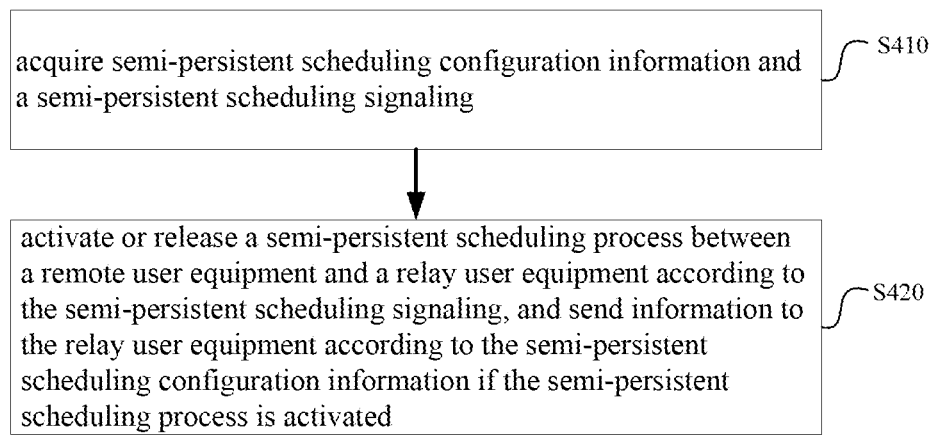
FIG. 4 is a flowchart of a semi-persistent scheduling method (for a remote user equipment) according to embodiment three of the present disclosure.

As shown in FIG. 4, an embodiment of the present disclosure provides a semi-persistent scheduling method applied to a remote user equipment. The method includes the steps described below.

In step S410, semi-persistent scheduling configuration information and semi-persistent scheduling signaling are acquired.

In step S420, a semi-persistent scheduling process between the remote user equipment and a relay user equipment is activated or released according to the semi-persistent scheduling signaling, and information is sent to the relay user equipment according to the semi-persistent scheduling configuration information if the semi-persistent scheduling process is activated.

The method further includes the features described below.

In an embodiment, acquiring the semi-persistent scheduling signaling includes one of the manners described below:

a semi-persistent scheduling activation or release rule is preconfigured;

the semi-persistent scheduling signaling sent by a base station is received through a first interface; or the semi-persistent scheduling signaling sent by the base station and forwarded by the relay user equipment to the remote user equipment is received through a second interface.

In an embodiment, acquiring the semi-persistent scheduling signaling includes one of the manners described below:

the semi-persistent scheduling configuration information is preconfigured;

the semi-persistent scheduling configuration information sent by the base station is received through the first interface; or the semi-persistent scheduling configuration information sent by the base station and forwarded by the relay user equipment to the remote user equipment is received through the second interface.

In an embodiment, the first interface refers to an interface between the base station and the relay user equipment and includes a Uu interface, and the second interface refers to an interface between the remote user equipment and the relay user equipment and includes a PC5 interface, a Bluetooth interface, a Wi-Fi interface, a wireless local area network interface, an infrared interface or a ZigBee interface. The expressions "first" and "second" are used to distinguish between two different communication interfaces.

In an embodiment, the remote user equipment includes a wearable equipment, a machine type communication equipment or an Internet of things equipment.

In an embodiment, the semi-persistent scheduling configuration information includes at least one of a user equipment identity, a semi-persistent scheduling period, a semi-persistent scheduling index, number of implicit releases for semi-persistent scheduling or a power control parameter.

The UE identity includes a radio network temporary identity (RNTI) of the UE.

In an embodiment, the semi-persistent scheduling signaling includes at least one of a semi-persistent scheduling index, an activation or release indicator, a resource block, a modulation and coding scheme or a power control indication.

In an embodiment, the semi-persistent scheduling configuration information is transmitted through radio resource control (RRC) signaling, and the semi-persistent scheduling signaling is transmitted through physical layer signaling, where the physical layer signaling includes downlink control information signaling or sidelink control information signaling.

In an embodiment, cyclic redundancy check content of the semi-persistent scheduling signaling is scrambled by using the user equipment identity.

In an embodiment, the remote user equipment determines, according to at least one of the following information, an interface through which the semi-persistent scheduling configuration information or the semi-persistent scheduling signaling is acquired: link quality, a quality-of-service requirement, a preconfigured rule, or indication information of the base station.

In an embodiment, the method further includes one of the steps described below:

semi-persistent scheduling assistance information is sent to the base station through the first interface; or the semi-persistent scheduling assistance information is sent to the base station through the second interface and a third interface by using the relay user equipment.

The third interface is an interface between the base station and the relay user equipment and includes a Uu interface.

The step of sending the semi-persistent scheduling assistance information to the base station or to the base station by using the relay user equipment includes detecting a service attribute change and sending the semi-persistent scheduling assistance information to the base station or to the base station by using the relay user equipment.

The semi-persistent scheduling assistance information is transmitted by using a radio resource control (RRC) signaling and includes an attribute parameter of a service using semi-persistent scheduling, where the attribute parameter includes at least one of a service period, a service sending time offset or a service packet size.

Optionally, the semi-persistent scheduling assistance information may be sent by using the RRC signaling or a MAC control element (CE) signaling.

In an embodiment, the step of activating or releasing the semi-persistent scheduling process between the remote user equipment and the relay user equipment according to the semi-persistent scheduling signaling includes activating or releasing one or more semi-persistent scheduling processes between the remote user equipment and the relay user equipment according to the semi-persistent scheduling signaling.

In an embodiment, the remote user equipment and the relay user equipment communicate by using a licensed spectrum or an unlicensed spectrum, and a communication frequency between the remote user equipment and the relay user equipment is the same as or different from a communication frequency between the remote user equipment and the base station.

Embodiment Four

Figure 5:
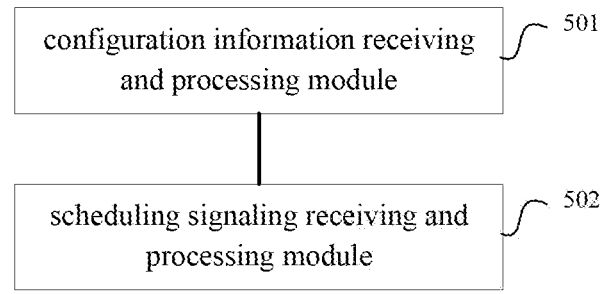
FIG. 5 is a schematic diagram of a semi-persistent scheduling apparatus (for a relay user equipment) according to embodiment four of the present disclosure.

As shown in FIG. 5, an embodiment of the present disclosure provides a semi-persistent scheduling apparatus applied to a relay user equipment. The apparatus includes a configuration information receiving and processing module 501 and a scheduling signaling receiving and processing module 502.

The configuration information receiving and processing module 501 is configured to receive, through a first interface, semi-persistent scheduling configuration information sent by a base station, and send the semi-persistent scheduling configuration information to a remote user equipment through a second interface to indicate that a semi-persistent scheduling mode is used in information transmission between the remote user equipment and the relay user equipment.

The scheduling signaling receiving and processing module 502 is configured to receive, through the first interface, a semi-persistent scheduling signaling sent by the base station, and send the semi-persistent scheduling signaling to the remote user equipment through the second interface to indicate activation or release of a semi-persistent scheduling process between the remote user equipment and the relay user equipment.

In an embodiment, the first interface is a communication interface between the relay user equipment and the base station and includes a Uu interface.

The second interface is a communication interface between the relay user equipment and the remote user equipment and includes a PC5 interface, a Bluetooth interface, a Wi-Fi interface, a wireless local area network interface, an infrared interface or a ZigBee interface.

In an embodiment, the semi-persistent scheduling configuration information includes at least one of a user equipment identity, a semi-persistent scheduling period, a semi-persistent scheduling index, number of implicit releases for semi-persistent scheduling or a power control parameter.

In an embodiment, the semi-persistent scheduling signaling includes at least one of the semi-persistent scheduling index, an activation or release indicator, a resource block, a modulation and coding scheme or a power control indication.

In an embodiment, the semi-persistent scheduling configuration information is transmitted through a radio resource control (RRC) signaling, and the semi-persistent scheduling signaling is transmitted through a physical layer signaling, where the physical layer signaling includes a downlink control information signaling or a sidelink control information signaling.

In an embodiment, cyclic redundancy check content of the semi-persistent scheduling signaling is scrambled by using the user equipment identity.

In an embodiment, the apparatus further includes an assistance information receiving and processing module 503.

The assistance information receiving and processing module 503 is configured to receive, through the second interface, semi-persistent scheduling assistance information sent by the remote user equipment, and send the semi-persistent scheduling assistance information to the base station through a third interface.

In an embodiment, the semi-persistent scheduling assistance information is transmitted by using the radio resource control signaling, and the semi-persistent scheduling assistance information includes an attribute parameter of a service using semi-persistent scheduling, where the attribute parameter includes at least one of a service period, a service sending time offset or a service packet size.

Embodiment Five

Figure 6:
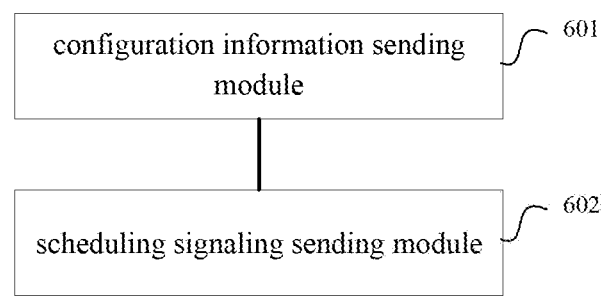
FIG. 6 is a schematic diagram of a semi-persistent scheduling apparatus (for a base station) according to embodiment five of the present disclosure.

As shown in FIG. 6, an embodiment of the present disclosure provides a semi-persistent scheduling apparatus applied to a base station. The apparatus includes a configuration information sending module 601 and a scheduling signaling sending module 602.

The configuration information sending module 601 is configured to send semi-persistent scheduling configuration information to a remote user equipment through a first interface or send the semi-persistent scheduling configuration information to the remote user equipment through a second interface and a third interface by using a relay user equipment to indicate that a semi-persistent scheduling mode is used in information transmission between the remote user equipment and the relay user equipment.

The scheduling signaling sending module 602 is configured to send a semi-persistent scheduling signaling to the remote user equipment through the first interface or send the semi-persistent scheduling signaling to the remote user equipment through the second interface and the third interface by using the relay user equipment to indicate activation or release of a semi-persistent scheduling process between the remote user equipment and the relay user equipment.

In an embodiment, the first interface is a communication interface between the base station and the remote user equipment and includes a Uu interface.

The second interface is a communication interface between the base station and the relay user equipment and includes a Uu interface.

The third interface is a communication interface between the relay user equipment and the remote user equipment and includes a PC5 interface, a Bluetooth interface, a Wi-Fi interface, a wireless local area network interface, an infrared interface or a ZigBee interface.

In an embodiment, the semi-persistent scheduling configuration information includes at least one of a user equipment identity, a semi-persistent scheduling period, a semi-persistent scheduling index, number of implicit releases for semi-persistent scheduling or a power control parameter.

In an embodiment, the semi-persistent scheduling signaling includes at least one of the semi-persistent scheduling index, an activation or release indicator, a resource block, a modulation and coding scheme or a power control indication.

In an embodiment, the semi-persistent scheduling configuration information is transmitted through a radio resource control (RRC) signaling, and the semi-persistent scheduling signaling is transmitted through physical layer signaling, where the physical layer signaling includes downlink control information signaling or sidelink control information signaling.

In an embodiment, cyclic redundancy check content of the semi-persistent scheduling signaling is scrambled by using the user equipment identity.

In an embodiment, the apparatus further includes an assistance information receiving and processing module 603.

The assistance information receiving and processing module 603 is configured to receive, through the first interface, semi-persistent scheduling assistance information sent by the remote user equipment, or receive, through the third interface and the second interface by using the relay user equipment, the semi-persistent scheduling assistance information sent by the remote user equipment.

In an embodiment, the semi-persistent scheduling assistance information is transmitted by using a radio resource control (RRC) signaling and includes an attribute parameter of a service using semi-persistent scheduling, where the attribute parameter includes at least one of a service period, a service sending time offset or a service packet size.

Embodiment Six

Figure 7:
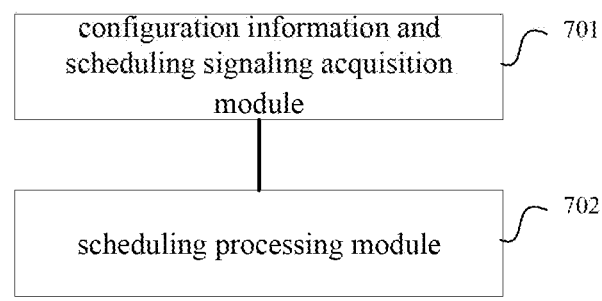
FIG. 7 is a schematic diagram of a semi-persistent scheduling apparatus (for a remote user equipment) according to embodiment six of the present disclosure.

As shown in FIG. 7, an embodiment of the present disclosure provides a semi-persistent scheduling apparatus applied to a remote user equipment. The apparatus includes a configuration information and scheduling signaling acquisition module 701 and a scheduling processing module 702.

The configuration information and scheduling signaling acquisition module 701 is configured to acquire semi-persistent scheduling configuration information and semi-persistent scheduling signaling.

The scheduling processing module 702 is configured to activate or release a semi-persistent scheduling process between the remote user equipment and a relay user equipment according to the semi-persistent scheduling signaling, and send information to the relay user equipment according to the semi-persistent scheduling configuration information if the semi-persistent scheduling process is activated.

In an embodiment, the configuration information and scheduling signaling acquisition module is configured to acquire the semi-persistent scheduling signaling in one of the manners described below.

A semi-persistent scheduling activation or release rule is preconfigured.

The semi-persistent scheduling signaling sent by a base station is received through a first interface.

The semi-persistent scheduling signaling sent by the base station and forwarded by the relay user equipment to the remote user equipment is received through a second interface.

In an embodiment, the configuration information and scheduling signaling acquisition module is configured to acquire the semi-persistent scheduling configuration information in one of the manners described below.

The semi-persistent scheduling configuration information is preconfigured.

The semi-persistent scheduling configuration information sent by the base station is received through the first interface.

The semi-persistent scheduling configuration information sent by the base station and forwarded by the relay user equipment to the remote user equipment is received through the second interface.

In an embodiment, the first interface is an interface between the base station and the remote user equipment and includes a Uu interface.

The second interface is an interface between the remote user equipment and the relay user equipment and includes a PC5 interface, a bluetooth interface, a Wi-Fi interface, a wireless local area network interface, an infrared interface or a ZigBee interface.

In an embodiment, the semi-persistent scheduling configuration information includes at least one of a user equipment identity, a semi-persistent scheduling period, a semi-persistent scheduling index, number of implicit releases for semi-persistent scheduling or a power control parameter.

In an embodiment, the semi-persistent scheduling signaling includes at least one of the semi-persistent scheduling index, an activation or release indicator, a resource block, a modulation and coding scheme or a power control indication.

In an embodiment, the semi-persistent scheduling configuration information is transmitted through radio resource control (RRC) signaling.

The semi-persistent scheduling signaling is transmitted through physical layer signaling, where the physical layer signaling includes downlink control information signaling or sidelink control information signaling.

In an embodiment, cyclic redundancy check content of the semi-persistent scheduling signaling is scrambled by using the user equipment identity.

In an embodiment, the apparatus further includes an assistance information sending module 703.

The assistance information sending module 703 is configured to send semi-persistent scheduling assistance information to the base station through the first interface.

Alternatively, the assistance information sending module 703 is configured to send the semi-persistent scheduling assistance information to the base station through the second interface and a third interface by using the relay user equipment.

The third interface is an interface between the base station and the relay user equipment and includes the Uu interface.

In an embodiment, the semi-persistent scheduling assistance information is transmitted by using the radio resource control (RRC) signaling and includes an attribute parameter of a service using semi-persistent scheduling, where the attribute parameter includes at least one of a service period, a service sending time offset or a service packet size.

In an embodiment, the remote user equipment determines, according to at least one of the following information, an interface through which the semi-persistent scheduling configuration information or the semi-persistent scheduling signaling is acquired: link quality, a quality-of-service requirement, a preconfigured rule, or indication information of the base station.

Embodiment Seven

An embodiment of the present disclosure provides a relay user equipment.

The relay user equipment includes a memory, a processor and a semi-persistent scheduling program stored in the memory and executable by the processor. The steps of the semi-persistent scheduling method of embodiment one are performed when the semi-persistent scheduling program is executed by the processor.

Embodiment Eight

An embodiment of the present disclosure provides a base station.

The base station includes a memory, a processor and a semi-persistent scheduling program stored in the memory and executable by the processor. The steps of the semi-persistent scheduling method of embodiment two are performed when the semi-persistent scheduling program is executed by the processor.

Embodiment Nine

An embodiment of the present disclosure provides a remote user equipment.

The remote user equipment includes a memory, a processor and a semi-persistent scheduling program stored in the memory and executable by the processor. The steps of the semi-persistent scheduling method of embodiment three are performed when the semi-persistent scheduling program is executed by the processor.

Embodiment Ten

An embodiment of the present disclosure provides a computer-readable storage medium, where the storage medium is configured to store a semi-persistent scheduling program. The steps of the semi-persistent scheduling method of embodiment one are performed when the semi-persistent scheduling program is executed by a processor.

Embodiment Eleven

An embodiment of the present disclosure provides a computer-readable storage medium, where the storage medium is configured to store a semi-persistent scheduling program. The steps of the semi-persistent scheduling method of embodiment two are performed when the semi-persistent scheduling program is executed by a processor.

Embodiment Twelve

An embodiment of the present disclosure provides a computer-readable storage medium, where the storage medium is configured to store a semi-persistent scheduling program. The steps of the semi-persistent scheduling method of embodiment three are performed when the semi-persistent scheduling program is executed by a processor.

The technical solution of the embodiments of the present disclosure are described below using some examples.

Example One

In FIG. 8-1, a remote user equipment (wearable user equipment (w-UE)) is located within the coverage of an access network base station, and an SPS signaling is transmitted through a Uu interface between an access network and the w-UE or forwarded by using a relay user equipment (r-UE). In FIG. 8-2, a remote user equipment (wearable user equipment (w-UE)) is located within or out of the coverage of an access network base station and SPS signaling is forwarded by using a relay user equipment (r-UE).

In FIG. 8-3, communication interface 1 (a Uu interface) is established between a remote user equipment and a base station, communication interface 2 (a Uu interface) is established between a relay user equipment and the base station, and communication interface 3 (a PC5 interface, a Wi-Fi interface or a Bluetooth (BT) interface) is established between the remote user equipment and the relay user equipment. Communication interface 1 and communication interface 3 may be at the same frequency or different frequencies, and communication interface 3 adopts a licensed spectrum or an unlicensed spectrum.

In this example, a semi-persistent scheduling method is described using the example in which communication interface 3 is the PC5 interface. The method includes the steps described below.

In step S101, the remote user equipment and the relay user equipment receive SPS configuration information.

The SPS configuration information is used for configuration of an SPS process where the remote user equipment sends signaling or data to the relay user equipment, and/or is used for configuration of an SPS process where the relay user equipment sends the signaling or data to the remote user equipment.

The SPS configuration information is preconfigured, or configured by the base station and sent to the remote user equipment and the relay user equipment by the base station, or configured by the base station and forwarded to the remote user equipment by the relay user equipment.

The SPS configuration information may be sent through radio resource control (RRC) signaling.

The SPS configuration information includes at least one of a UE identity, an SPS period, an SPS index, number of implicit releases for SPS and a power control parameter.

The UE identity is configured to indicate a UE participating in SPS. The UE is generally indicated by a specific radio network temporary identity (RNTI).

The SPS period refers to an SPS interval and is generally the same as a sending interval of a specific service.

The SPS index is configured to identify multiple SPS processes that are simultaneously activated.

The number of implicit releases for SPS is defined as follows: after a UE sends a media access control (MAC) protocol data unit (PDU) not containing a MAC service data unit (SDU) for multiple times (for example, n times), corresponding SPS processes are released, where n is the number of implicit releases for SPS.

The power control parameter refers to a UE power control parameter related to the SPS.

Optionally, before receiving the SPS configuration information, the UE may report assistance information to request the SPS, where the assistance information includes an attribute parameter, for example, a period, an offset, a packet size or the like, of a service using SPS.

The assistance information may be sent by using the RRC signaling or MAC control element (CE) signaling. The w-UE may send the assistance information to the r-UE through PC5 and the r-UE may forward the assistance information to the base station through Uu, or the w-UE may send the assistance information to the base station through the Uu. The remote user equipment is in an RRC connected state or an RRC idle state, and the relay user equipment is in the RRC connected state.

Optionally, the relay user equipment is associated with multiple remote user equipments in advance, and the base station knows the association relationship.

Optionally, the SPS configuration information may be indicated through sending a resource pool via the PC5 interface, and a resource for SPS is identified in the resource pool.

In step S102, the remote user equipment and/or the relay user equipment receives the SPS signaling.

The SPS signaling is configured to activate or release the SPS process between the remote user equipment and the relay user equipment.

The SPS signaling is sent by using layer 1 (physical layer) signaling and includes any one of downlink control information (DCI) signaling or sidelink control information (SCI) signaling.

The SPS signaling includes at least one of the SPS index, a resource block, a modulation and coding scheme (MCS), or a power control indication.

The cyclic redundancy check (CRC) of a physical downlink control channel (PDCCH) where the DCI is located or a physical sidelink control channel (PSCCH) where the SCI is located is scrambled by using a specific radio network temporary identity (RNTI) of the SPS.

In the SPS signaling, different pieces of information are adopted to indicate activation and release, and corresponding information formats are specified in advance.

If the relay user equipment receives the SPS signaling sent by the base station, then the relay user equipment forwards the SPS signaling to the remote user equipment. For example, the relay user equipment receives the DCI sent by the base station, where the DCI carries the SPS signaling, and then, the relay user equipment configures the SCI according to the DCI and sends the SCI to the remote user equipment through the PC5 interface, where the SCI carries the SPS signaling.

The relay user equipment may be associated with multiple remote user equipments, and the multiple remote user equipments may be associated with multiple relay user equipment. The association relationship between the remote user equipment and the relay user equipment may be configured by a high layer, and related remote user equipments, relay user equipments and base stations are notified of the association relationship in advance.

If the remote user equipment is within the coverage of the base station, then the base station indicates whether the remote user equipment receives an SPS command through the Uu or the PC5, and the base station also indicates that the relay user equipment forwards the SPS command to the remote user equipment through the PC5. If the remote user equipment is out of the coverage of the base station, then the remote user equipment receives the SPS command through the PC5.

In step S103, the remote user equipment activates or releases the SPS process.

The remote user equipment activates the SPS process according to the SPS command and schedules the SPS process by using the SPS configuration information. To implement discontinuous reception (DRX) of the PC5 interface, the active time of the PC5 SPS needs to be staggered with the sleep time of the PC5 DRX. That is, the scheduling time of the PC5 SPS is not the sleep time of the PC5 DRX, and otherwise, a remote UE using the PC5 DRX cannot receive the content of the PC5 SPS required.

In view of the half-duplex feature of the PC5 UE, when the base station activates the PC5 SPS, the base station needs to stagger the PC5 SPS time of the relay user equipment with the PC5 SPS time of the remote user equipment. That is, the PC5 SPS time of the relay user equipment is different from the PC5 SPS time of the remote user equipment.

The remote user equipment releases the SPS process according to the SPS command, and then may use dynamic scheduling or select resources autonomously to send data or signaling through the PC5.

Example Two

This example provides a semi-persistent scheduling method, where a remote user equipment is referred to simply as a w-UE, a relay user equipment is referred to simply as an r-UE, and a base station directly sends SPS configuration information and SPS signaling to the remote user equipment. The method includes the steps described below.

In step 101, the base station sends PC5 SPS configuration information.

The w-UE is in an RRC connected state.

The configuration information is carried by using RRC signaling, and the configuration information includes at least one of a UE identity, a PC5 SPS period, a PC5 SPS index, number of implicit releases for PC5 SPS and a power control parameter.

In step 102, the w-UE listens for PC5 SPS activation signaling.

The w-UE listens for the PC5 SPS activation signaling through a Uu interface, and the PC5 SPS activation signaling is sent over a PDCCH by the base station through DCI. CRC of the PDCCH is scrambled by using a dedicated RNTI of the PC5 SPS, and the w-UE may obtain the dedicated RNTI through the UE identity in the configuration information in the step 101.

Exemplarily, the w-UE detects a PDCCH of a received downlink sub-frame by using the UE identity in step 101.

In step 103, it is determined whether to activate the PC5 SPS; if it is determined to activate the PC5 SPS, the method goes to step 104; and otherwise, the method goes to step 105.

If the w-UE detects the PDCCH scrambled by using a w-UE identity, then the DCI content over the PDCCH is further decoded, and it is determined, according to a predefined activation/release information field, whether the DCI is to activate the PC5 SPS. The predefined activation/release information field refers to a field that is in an existing DCI format in the DCI and set to different values, where activation corresponds to one value and release corresponds to the other value. For example, "110011" corresponds to the activation, and "001100" corresponds to the release. If the DCI content decoded by the w-UE does not conform to the predefined activation/release, the w-UE regards that the CRC of the DCI received does not match.

In step 104, the w-UE activates a PC5 SPS process.

The w-UE starts to adopt the PC5 SPS according to the PC5 SPS configuration information in step 101. There are one or more PC5 SPS processes.

In step 105, the w-UE does not activate the PC5 SPS process.

If the w-UE does not receive the PC5 SPS activation signaling of the base station, or receives PC5 SPS release signaling sent by the base station, or the DCI decoded by the w-UE does not conform to the definition of the PC5 SPS activation/release, then the w-UE does not activate the PC5 SPS, where the "not activation" refers to one of releasing the PC5 SPS or using an original scheduling mode (for example, the dynamic scheduling or autonomously selecting resources).

Example Three

This example provides a semi-persistent scheduling method, where a remote user equipment is referred to simply as a w-UE, a relay user equipment is referred to simply as an r-UE, and a base station sends SPS configuration information and SPS signaling to the remote user equipment by using the relay user equipment. The method includes the steps described below.

In step 101, the base station sends PC5 SPS configuration information to the r-UE.

The base station sends the PC5 SPS configuration information to the r-UE through Uu, where the PC5 SPS configuration information is for the w-UE.

The base station chooses to send the PC5 SPS configuration information to the r-UE according to at least one of link quality, a quality-of-service (QoS) requirement, a congestion degree, a w-UE location, an r-UE/w-UE capability or an operator policy. For example, the base station chooses to send the PC5 SPS configuration information by using the r-UE if a link between the base station and the w-UE has poor link quality (below a threshold value), and/or there are link congestion between the base station and the w-UE, and/or the w-UE is out of the coverage of the base station, and/or the r-UE has the capability to forward through PC5/the w-UE has the capability to receive through the PC5, and/or the operator requests to forward by using the r-UE, or the like. The configuration information needs to indicate that the information is forwarded for the w-UE, that is, the r-UE needs to forward the configuration information.

In step 102, the r-UE forwards PC5 SPS signaling to the w-UE.

A connection has been established between the r-UE and the w-UE. The r-UE forwards the PC5 SPS signaling to the w-UE through a PC5 interface.

To reduce signaling between the r-UE and the w-UE, the r-UE may forward the PC5 SPS configuration information after receiving PC5 SPS activation signaling sent by the base station. That is, step 102 may be combined with step 105.

In step 103, the r-UE listens for the PC5 SPS activation signaling.

The r-UE detects a PDCCH sent by the base station, detects CRC of the PDCCH by using a specific RNTI of PC5 SPS, and further decodes DCI content. If the decoded DCI content matches with predefined PC5 SPS activation/release signaling, then the base station is regarded to activate/release the PC5 SPS. The PC5 SPS activation signaling includes a PC5 SPS identity, for example, a PC5 SPS index.

In step 104, it is determined whether to activate the PC5 SPS; if it is determined to activate the PC5 SPS, the method goes to step 105; and otherwise, the method goes to step 103.

If the r-UE determines to activate the PC5 SPS of the w-UE, then a PC5 SPS process is continued; and otherwise, the r-UE continues to listen for the PC5 SPS activation signaling.

In step 105, the r-UE forwards the PC5 SPS activation signaling.

The r-UE forwards the PC5 SPS activation signaling to the w-UE through the PC5 interface, and the w-UE receives the PC5 SPS activation signaling and performs the PC5 SPS by using the corresponding PC5 SPS configuration information.

Example Four

This example provides a semi-persistent scheduling method, where a remote user equipment is referred to simply as a w-UE, a relay user equipment is referred to simply as an r-UE, and the remote user equipment sends SPS assistance information to a base station. The method includes the steps described below.

In step 101, the w-UE determines whether to send the PC5 SPS assistance information to the base station directly; if the w-UE determines to send the PC5 SPS assistance information to the base station directly, the method goes to step 102; and otherwise, the method goes to step 103.

If the w-UE detects an attribute change of PC5 transmission service, for example, at least one of a period change, an offset change, a packet-size change of the PC5 transmission service, then the w-UE determines to send the PC5 SPS assistance information. Furthermore, the w-UE selects, according to at least one of the following conditions, to send the assistance information the base station or the r-UE: link quality, a QoS requirement, an operator policy, a w-UE/r-UE capability, a congestion situation, a w-UE location or the like. The PC5 SPS assistance information includes at least one of a period, an offset or a packet size.

In step 102, the w-UE sends the PC5 SPS assistance information to the base station.

The w-UE determines to send the PC5 SPS assistance information to the base station through Uu if a Uu link quality satisfies the needs, and/or an operator requires to send through the Uu, and/or the w-UE is capable of sending the information through the Uu, and/or the r-UE is not capable of forwarding, and/or a PC5 link is congested, and/or the w-UE is located within the coverage of the base station.

In step 103, the w-UE sends the PC5 SPS assistance information to the base station.

The w-UE has established a connection with the r-UE and sends the PC5 SPS assistance information to the r-UE through the PC5.

In step 104, the r-UE processes the received PC5 SPS assistance information.

The r-UE receives the PC5 SPS assistance information from the w-UE. If the r-UE can process the information locally, that is, reconfigure a PC5 SPS parameter of the w-UE, then r-UE locally processes the PC5 SPS assistance information and may notify the base station of the locally processed result. Otherwise, the r-UE forwards the received PC5 SPS assistance information to the base station.

Example Five

This example provides a semi-persistent scheduling method, where a remote user equipment is referred to simply as a w-UE, a relay user equipment is referred to simply as an r-UE, and SPS configuration information is indicated through a resource pool. The method includes the steps described below.

In step 101, a PC5 SPS resource is configured to be indicated in the resource pool.

The configuration is performed by a base station or the r-UE. The PC5 SPS resource refers to a dedicated resource of PC5 SPS and may be used for at least one of the r-UE or the w-UE. A PC5 SPS resource for the r-UE is configured by the base station, and a PC5 SPS resource for the w-UE is configured by the base station or the r-UE.

In step 102, the w-UE listens for PC5 SPS activation signaling.

The UE includes at least one of the r-UE or the w-UE. The activation signaling is sent by the base station, where the r-UE listens through Uu, the w-UE listens through the Uu or PC5, and the w-UE determines to listen through the Uu interface or the PC5 according to priori information, for example, indication information of the base station.

In step 103, it is determined whether to activate the PC5 SPS; if it is determined to activate the PC5 SPS, the method goes to step 104; and otherwise, the method goes to step 105.

If the UE receives the PC5 SPS activation signaling, then a PC5 SPS process is activated, and otherwise, the PC5 SPS is not activated.

In step 104, the UE sends information by using the PC5 SPS resource in the resource pool.

The PC5 SPS process is activated, and the UE uses the corresponding resource in the resource pool to send information in an SPS mode through the PC5.

In step 105, the UE sends information by using resources in the resource pool other than the PC5 SPS resource.

If the PC5 SPS is inactive, then the UE sends the information through the PC5 by using the remaining resources (non-PC5 SPS resources).

Example Six

This example provides a semi-persistent scheduling method, where a remote user equipment is referred to simply as a w-UE, a relay user equipment is referred to simply as an r-UE, and the r-UE send SPS configuration information. The method includes the steps described below.

In step 101, a PC5 connection is established between the r-UE and the w-UE.

An RRC connection is established between the r-UE and the w-UE through PC5.

In step 102, the r-UE sends PC5 SPS configuration information to the w-UE.

The r-UE sends the PC5 SPS configuration information to the w-UE through the PC5, and the PC5 SPS configuration information may be configured by a base station or a r-UE licensed by the base station.

The PC5 SPS configuration information is carried by using RRC signaling or indicated in a sending resource pool of the PC5.

In step 103, the w-UE listens for PC5 SPS activation signaling.

The w-UE listens for the PC5 SPS activation signaling through a PC5 interface or a Uu interface. Exemplarily, the PC5 SPS configuration information may indicate whether the w-UE listens for the activation signaling through the PC5 interface or the Uu interface.

It is to be noted that the present application may have other various embodiments. Corresponding changes and modifications may be made by those skilled in the art according to the present application without departing from the spirit and essence of the present application. However, these corresponding changes and modifications fall within the scope of the claims in the present application.

INDUSTRIAL APPLICABILITY

According to a semi-persistent scheduling solution provided in the present disclosure, a relay user equipment receives, through a first interface, semi-persistent scheduling configuration information sent by a base station, and sends the semi-persistent scheduling configuration information to a remote user equipment through a second interface to indicate that a semi-persistent scheduling mode is used in information transmission between the remote user equipment and the relay user equipment; the relay user equipment receives, through the first interface, a semi-persistent scheduling signaling sent by the base station, and sends the semi-persistent scheduling signaling to the remote user equipment through the second interface to indicate activation or release of a semi-persistent scheduling process between the remote user equipment and the relay user equipment. In this way, semi-persistent scheduling between the remote user equipment and the relay user equipment is implemented.

What is claimed is:

1. A semi-persistent scheduling method, comprising:
receiving, through a second interface, semi-persistent scheduling assistance information sent by a remote user equipment, and sending the semi-persistent scheduling assistance information to a base station through a first interface, wherein the semi-persistent scheduling assistance information comprises an attribute parameter of a service using semi-persistent scheduling, and the attribute parameter comprises: a service sending time offset, and a service packet size;
receiving, through the first interface, semi-persistent scheduling configuration information sent by the base station, and sending the semi-persistent scheduling configuration information to the remote user equipment through the second interface to indicate that a semi-persistent scheduling mode is used in information transmission between the remote user equipment and a relay user equipment; and
receiving, through the first interface, a semi-persistent scheduling signaling sent by the base station, and sending the semi-persistent scheduling signaling to the remote user equipment through the second interface to indicate activation or release of a semi-persistent scheduling process between the remote user equipment and the relay user equipment;
wherein the semi-persistent scheduling assistance information is transmitted by using a radio resource control signaling.

2. The semi-persistent scheduling method of claim 1, wherein
the first interface is a communication interface between the relay user equipment and the base station and comprises a Uu interface; and
the second interface is a communication interface between the relay user equipment and the remote user equipment and comprises a PC5 interface, a Bluetooth interface, a Wi-Fi interface, a wireless local area network interface, an infrared interface or a ZigBee interface.

3. The semi-persistent scheduling method of claim 1, wherein
the semi-persistent scheduling configuration information comprises at least one of a user equipment identity, a semi-persistent scheduling period, a semi-persistent scheduling index, number of implicit releases for semi-persistent scheduling or a power control parameter; and
wherein the semi-persistent scheduling signaling comprises at least one of a semi-persistent scheduling index, an activation or release indicator, a resource block, a modulation and coding scheme or a power control indication.

4. The semi-persistent scheduling method of claim 1, wherein
the semi-persistent scheduling configuration information is transmitted through a radio resource control (RRC) signaling, and the semi-persistent scheduling signaling is transmitted through a physical layer signaling, wherein the physical layer signaling comprises a downlink control information signaling or a sidelink control information signaling; and
wherein cyclic redundancy check content of the semi-persistent scheduling signaling is scrambled by using a user equipment identity.

5. A semi-persistent scheduling method, comprising:
receiving, through a first interface, semi-persistent scheduling assistance information sent by a remote user equipment, or receiving, through a third interface and a second interface by using a relay user equipment, the semi-persistent scheduling assistance information sent by the remote user equipment, wherein the semi-persistent scheduling assistance information comprises an attribute parameter of a service using semi-persistent scheduling, and the attribute parameter comprises: a service sending time offset and a service packet size;
sending semi-persistent scheduling configuration information to the remote user equipment through the first interface or sending the semi-persistent scheduling configuration information to the remote user equipment through the second interface and the third interface by using the relay user equipment to indicate that a semi-persistent scheduling mode is used in information transmission between the remote user equipment and the relay user equipment; and
sending a semi-persistent scheduling signaling to the remote user equipment through the first interface or sending the semi-persistent scheduling signaling to the remote user equipment through the second interface and the third interface by using the relay user equipment to indicate activation or release of a semi-persistent scheduling process between the remote user equipment and the relay user equipment;
wherein the semi-persistent scheduling assistance information is transmitted by using a radio resource control (RRC) signaling.

6. The semi-persistent scheduling method of claim 5, wherein
the first interface is a communication interface between a base station and the remote user equipment and comprises a Uu interface;
the second interface is a communication interface between the base station and the relay user equipment and comprises a Uu interface; and
the third interface is a communication interface between the relay user equipment and the remote user equipment and comprises a PC5 interface, a Bluetooth interface, a Wi-Fi interface, a wireless local area network interface, an infrared interface or a ZigBee interface.

7. The semi-persistent scheduling method of claim 5, wherein
the semi-persistent scheduling configuration information comprises at least one of a user equipment identity, a semi-persistent scheduling period, a semi-persistent scheduling index, number of implicit releases for semi-persistent scheduling or a power control parameter; and
wherein the semi-persistent scheduling signaling comprises at least one of a semi-persistent scheduling index, an activation or release indicator, a resource block, a modulation and coding scheme or a power control indication.

8. The semi-persistent scheduling method of claim 5, wherein
the semi-persistent scheduling configuration information is transmitted through a radio resource control (RRC) signaling, and the semi-persistent scheduling signaling is transmitted through a physical layer signaling, wherein the physical layer signaling comprises a downlink control information signaling or a sidelink control information signaling; and
wherein cyclic redundancy check content of the semi-persistent scheduling signaling is scrambled by using a user equipment identity.

9. A semi-persistent scheduling method, comprising:
sending, by a remote user equipment, semi-persistent scheduling assistance information to a base station through a first interface between a base station and the remote user equipment or sending the semi-persistent scheduling assistance information to the base station through a second interface and a third interface by using a relay user equipment, wherein the second interface is an interface between the remote user equipment and the relay user equipment, the third interface is an interface between the base station and the relay user equipment and comprises a Uu interface, and wherein the semi-persistent scheduling assistance information comprises an attribute parameter of a service using semi-persistent scheduling and the attribute parameter comprises: a service sending time offset and a service packet size;
acquiring, by the remote user equipment, semi-persistent scheduling configuration information and a semi-persistent scheduling signaling through a first interface or through a second interface; and
activating or releasing, by the remote user equipment, a semi-persistent scheduling process between the remote user equipment and the relay user equipment according to the semi-persistent scheduling signaling, and sending information to the relay user equipment according to the semi-persistent scheduling configuration information if the semi-persistent scheduling process is activated;
wherein the semi-persistent scheduling assistance information is transmitted by using a radio resource control (RRC) signaling; and
wherein the remote user equipment determines, according to at least one of following information, an interface through which the semi-persistent scheduling configuration information or the semi-persistent scheduling signaling is acquired: link quality, a quality-of-service requirement, a preconfigured rule, or indication information of a base station.

10. The semi-persistent scheduling method of claim 9, wherein
acquiring the semi-persistent scheduling signaling comprises one of following manners:
preconfiguring a semi-persistent scheduling activation or release rule;
receiving, through the first interface, the semi-persistent scheduling signaling sent by the base station; or
receiving the semi-persistent scheduling signaling which is sent by the base station to the relay user equipment through a third interface and is forwarded by the relay user equipment to the remote user equipment through the second interface; and
wherein acquiring the semi-persistent scheduling configuration information comprises one of following manners:
preconfiguring the semi-persistent scheduling configuration information;
receiving, through the first interface, the semi-persistent scheduling configuration information sent by the base station; or
receiving the semi-persistent scheduling configuration information which is sent by the base station to the relay user equipment through a third interface and is forwarded by the relay user equipment to the remote user equipment through the second interface.

11. The semi-persistent scheduling method of claim 10, wherein
the first interface comprises a Uu interface; and
the second interface comprises a PC5 interface, a Bluetooth interface, a Wi-Fi interface, a wireless local area network interface, an infrared interface or a ZigBee interface.

12. The semi-persistent scheduling method of claim 9, wherein
the semi-persistent scheduling configuration information comprises at least one of a user equipment identity, a semi-persistent scheduling period, a semi-persistent scheduling index, number of implicit releases for semi-persistent scheduling or a power control parameter; and
wherein the semi-persistent scheduling signaling comprises at least one of a semi-persistent scheduling index, an activation or release indicator, a resource block, a modulation and coding scheme or a power control indication.

13. The semi-persistent scheduling method of claim 9, wherein
the semi-persistent scheduling configuration information is transmitted through a radio resource control (RRC) signaling;
the semi-persistent scheduling signaling is transmitted through a physical layer signaling, wherein the physical layer signaling comprises a downlink control information signaling or a sidelink control information signaling; and
cyclic redundancy check content of the semi-persistent scheduling signaling is scrambled by using a user equipment identity.

14. A relay user equipment, comprising:
a memory, a processor and a semi-persistent scheduling program stored in the memory and executable by the processor, wherein steps of the semi-persistent scheduling method of claim 1 are performed when the semi-persistent scheduling program is executed by the processor.

15. A base station, comprising:
a memory, a processor and a semi-persistent scheduling program stored in the memory and executable by the processor, wherein steps of the semi-persistent scheduling method of claim 5 are performed when the semi-persistent scheduling program is executed by the processor.

16. A remote user equipment, comprising:
a memory, a processor and a semi-persistent scheduling program stored in the memory and executable by the processor, wherein steps of the semi-persistent scheduling method of claim 9 are performed when the semi-persistent scheduling program is executed by the processor.

* * * * *